United States Patent [19]

Myatt

[11] Patent Number: 5,196,845
[45] Date of Patent: Mar. 23, 1993

[54] ANTENNA FOR TIRE MONITORING DEVICE

[75] Inventor: David Myatt, Chateaugay, France

[73] Assignee: Compagnie Generale des Etablissements Michelin, Clermont-Ferrand Cedex, France

[21] Appl. No.: 818,441

[22] Filed: Dec. 27, 1991

Related U.S. Application Data

[63] Continuation of Ser. No. 424,911, Oct. 23, 1989, abandoned.

[30] Foreign Application Priority Data

Oct. 24, 1988 [FR] France .................. 88 14295

[51] Int. Cl.⁵ ............................................. G08C 19/06
[52] U.S. Cl. ...................... 340/870.31; 340/870.33; 340/970.37; 340/448; 340/475; 73/146.5
[58] Field of Search ............ 340/448, 870.31, 870.33, 340/870.37, 442, 445, 447; 73/146.4, 146.5; 343/745, 749, 750

[56] References Cited

U.S. PATENT DOCUMENTS

| | | | |
|---|---|---|---|
| 3,155,938 | 11/1964 | Meyers | 340/448 |
| 3,602,884 | 8/1971 | Brumbelow | 340/448 |
| 3,646,449 | 2/1972 | Hellbarth et al. | 455/193 |
| 4,064,482 | 12/1977 | Maisch et al. | 340/448 |
| 4,554,504 | 11/1985 | Dillion | 323/356 |
| 4,737,761 | 4/1988 | Dasjoub et al. | 73/146.5 |
| 4,760,356 | 7/1988 | Kempster | 333/177 |
| 4,942,510 | 7/1990 | Edwards | 73/146.5 |

FOREIGN PATENT DOCUMENTS

| | | |
|---|---|---|
| 0165640 | 12/1985 | European Pat. Off. . |
| 112140 | 7/1982 | Japan . |
| 1153900 | 5/1969 | United Kingdom . |

OTHER PUBLICATIONS

Kraus; Electromagnetics; 1984 third edition; pp. 245-248.

Primary Examiner—Donald J. Yusko
Assistant Examiner—Michael Horabik
Attorney, Agent, or Firm—Oblon, Spivak, McClelland, Maier & Neustadt

[57] ABSTRACT

An antenna to be used with transponder type devices. The antenna includes an inductance and a capacitor forming a resonant circuit. To avoid any heating and to have a sufficiently broad passband or operating range, there is in parallel with the inductance, a branch comprising two Zener diodes connected in opposite directions. Any nonlinear damping arrangement having an equivalent effect may be used in the branch.

18 Claims, 3 Drawing Sheets

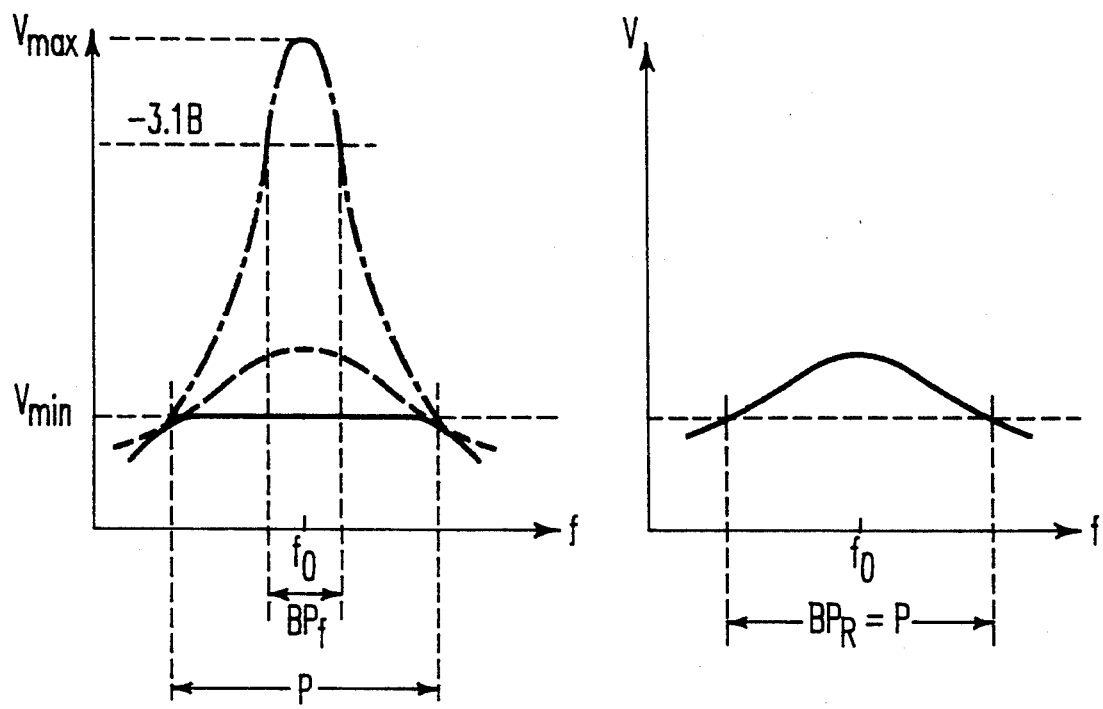
*FIG. 2A*
*FIG. 2B*
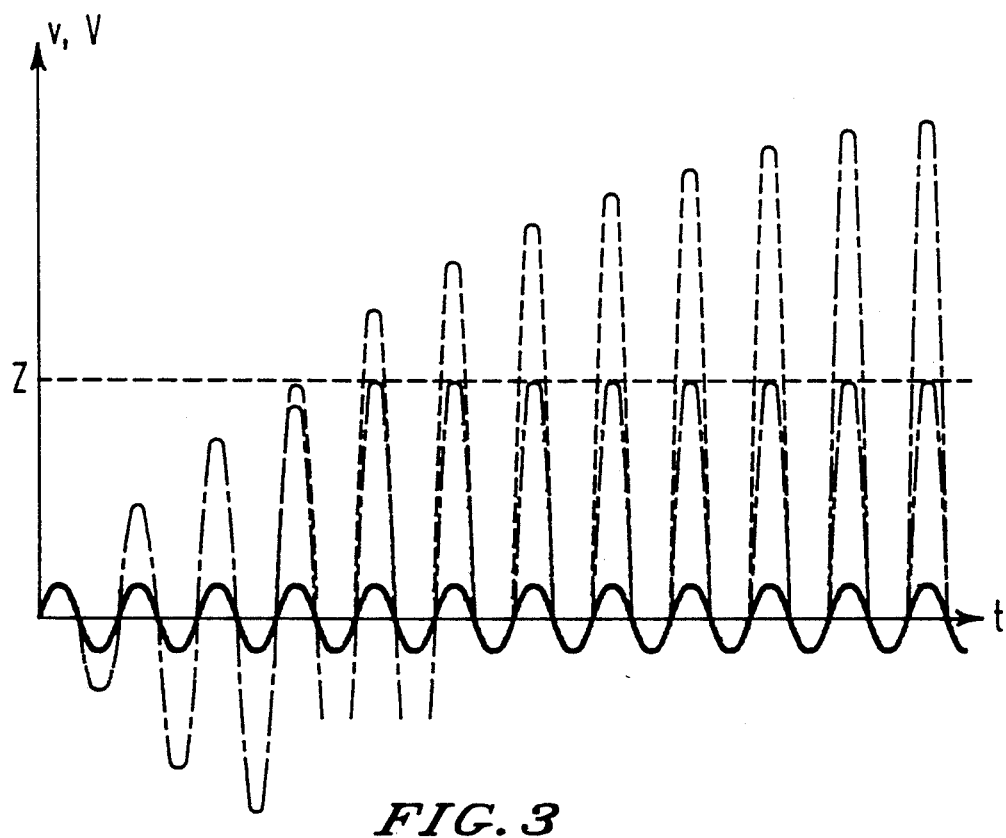
*FIG. 3*

ABS, 196,845

ANTENNA FOR TIRE MONITORING DEVICE

This application is a continuation of application Ser. No. 07/424,911, filed on Oct. 23, 1989, now abandoned.

BACKGROUND OF THE INVENTION

1. Field of the Invention

This invention relates generally to tire monitoring devices of the transponder type, and more particularly to a tire monitoring device with an inductive antenna that can be used for transmission of signals by resonant inductive coupling to an antenna used as a fixed antenna connected to the frame.

2. Discussion of the Background

U.S. Pat. No. 4,737,761 shows how it is possible to collect sufficient energy by an inductive coupling between two coils, and how it is possible to use it efficiently. Sending of energy to the wheel is performed by inductive coupling between an antenna connected to a fixed point of the vehicle, for example, the wheel carrier or a brake caliper, and an antenna mounted on the wheel. These antennas will be designated by "fixed antenna" and "wheel antenna," respectively. Numerous variants are possible for constituting and positioning these antennas. Since the basic principle is the use of the inductive coupling, these antennas each comprise at least one coil.

The coil connected to the frame optionally is used both for sending energy to the wheel and for receiving a coded signal sent by the wheel.

To transmit the energy between two coils, the emitting coil should be able to generate a sufficient alternating induction field. In practice, it has been found that to generate this field, it is necessary to apply high voltages, which are not immediately available, across the terminals of the coil. Therefore, it is necessary to adapt the number of turns of each of the coils to obtain a suitable transformation ratio, to add a capacitor to the emitting coil to obtain a series resonant circuit, or to adapt the inductance of the coil to use the stray capacitances that can be considerable at times. At resonance, the voltage across the terminals of the coil is equal to the supply voltage multiplied by an overvoltage coefficient.

By convention, a unit comprising at least the emitting or receiving coil and the capacitance creating a resonant circuit is called an "antenna." In practice, this capacitance is obtained by adding a capacitor in series with the coil. However, in certain installations on the vehicle, the stray capacitance by itself may be sufficient. The capacitor and coil are very close to one another and are located in the same mechanical protective box, to avoid subjecting long electric lines to high voltages.

SUMMARY OF THE INVENTION

This invention relates to such an antenna, in particular to the fixed antenna and in its function of transmission of energy. The possible role of this antenna in receiving the signal is not of concern.

Actually, it is very difficult to exactly obtain the resonance conditions, because of the scattering of the value of the inductance of the coil, of the capacitance of the capacitor, and also because of the drifts of these same values, etc.

The voltage across the terminals of the coil decreases very rapidly in going away from optimal conditions.

Therefore a maximal range of variation of these conditions has to be established, within which a sufficient induction field is assured.

This operating range corresponds to a necessary value tolerance of the operating frequency of the energy supply circuit. In this case, the broader the operating range, the poorer the quality factor of the resonant circuit must be, for fear of having a far too great voltage amplification if the ideal resonance conditions occur. This therefore makes it necessary to introduce resistors to limit the quality factor. Very great energy dissipations occur as a result, detracting from the economy of operation, but especially causing heating unacceptable for installation on a vehicle, especially a passenger vehicle.

The solution according to the invention consists in introducing a nonlinear damping of the resonance. The antenna according to the invention, includes an inductance-forming coil, and a capacitance connected in series and/or parallel, the capacitance and the inductance forming a resonant circuit. Most importantly, the antenna includes a device to clip the flux passing from this antenna to the coupled antenna.

Accordingly, one object of the present invention is to provide a simplified antenna for a tire monitoring device.

Another object of the invention is to provide an antenna for a tire monitoring device which avoids any unnecessary heating.

A further object of this device is to provide an antenna for a tire monitoring device to provide a sufficiently broad operating range of the antenna.

A still further object of the invention is to provide an antenna with a sufficiently low quality factor without a resistor.

These and other objects of the invention may be accomplished by providing a branch in parallel with the coil or capacitor where the branch includes two Zener diodes or some other non-linear damping arrangement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A and 2B are graphs of the Q factor of each of the two antennas.

FIG. 3 is a graph showing the transfer of energy between the coils.

DESCRIPTION OF THE PREFERRED EMBODIMENTS

Figure 1A:
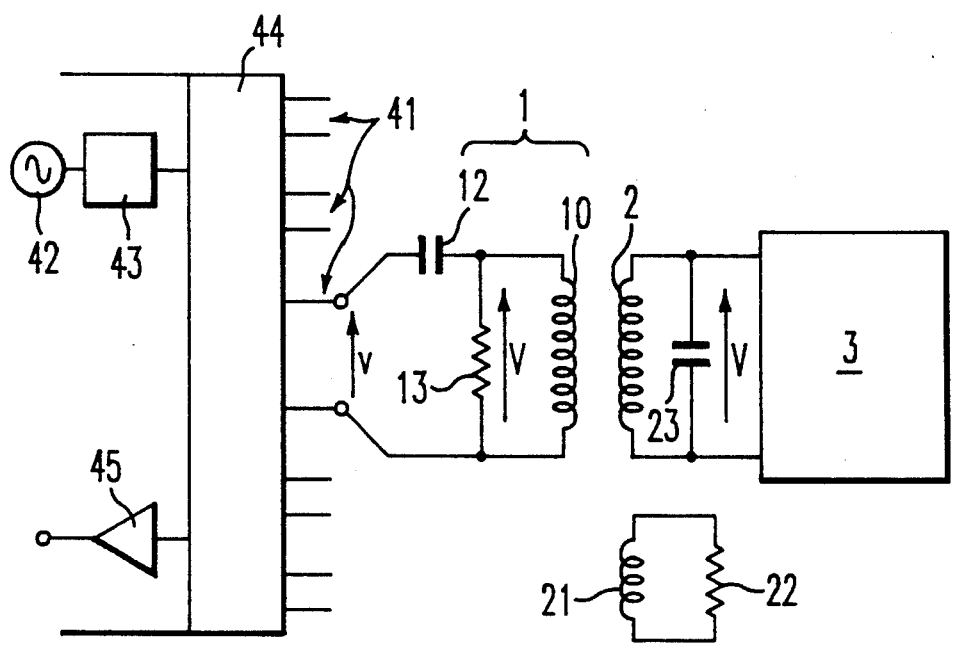
FIG. 1A is a schematic diagram of a tire monitoring device of the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1A shows a coil 10 and a capacitor 12 forming part of fixed antenna 1, and a coil 2 constituting the wheel antenna. Wheel module 3 comprises the elements necessary for storing the transmitted energy, and for its use, and also a stage of coding emitted signals. Preferably, this wheel module is designed according to the teachings of U.S. Pat. Nos. 4,703,650 and 4,737,761. The wheel module therefore comprises one or more capacitors forming an energy reservoir. There is installed on the vehicle an excitation and monitoring unit 4 which is connected to each fixed antenna 1 by an electric line 41. This unit 4 comprises a generator 42 producing a signal at a frequency selected for power transmission, namely, in this example 83 kHz, and a power amplifier 43. A control device 44 selects a wheel by the sending of energy and also assures connection of the wheel, which is to be inspected, to a low-level signal amplifier 45 to collect the coded signal emitted by said wheel.

Fixed antenna 1 also comprises a capacitor 12 to create a series resonant circuit. FIGS. 2A and 2B make it possible to understand better the operation of fixed antenna 1 and wheel antenna 2, respectively. It is desirable that a voltage V applied to wheel module 3 provides a good charge of the capacitor or capacitors forming the energy reservoir in module 3. Preferably, the charge time should be less than 100 milliseconds. Wheel antenna 2 is dimensioned and installed on the wheel so that, when stray capacitances 23 making it possible to seek a parallel resonance are considered, the resonance frequency fo corresponds to 83 kHz mentioned above. The wheel itself is electrically conductive and acts as a shortcircuit turn 21, whose internal resistance is shown by resistor 22.

Before going on, let us note that if the wheel, or more precisely the rim on which wheel antenna 2 is mounted, is not conductive, which now represents only a very small part of the cases encountered in motor vehicles, the teaching set forth in this description relative to fixed antenna 1 can also be applied to wheel antenna 2.

FIG. 2B represents the potential difference collected across the terminals of coil 2 as a function of the operating frequency. In practice, the quality factor of such a parallel resonant circuit is poor, due to damping caused by the rim. Therefore passband BPr is sufficiently broad to correspond to an operating range those extent is dictated by industrial considerations: variations of the values for coil 2, stray capacitance 23, damping resistor 22, operating temperature, etc.

On the other hand, fixed antenna 1 intrinsically has a very high quality factor, schematized by the curve in dot-dash lines in FIG. 2A. A very narrow passband BPf results, much narrower than operating range P imposed by industrial considerations of tolerances. Therefore if care is given that the level of voltage $U_{min}$ is sufficient at the edges of range P, then voltage $U_{max}$ will be far too great. For this purpose, before the present invention, a resistor was introduced in series with capacitor 12 and coil 10, or in parallel with one of these elements, to degrade the quality factor sufficiently to find a characteristic curve of voltage U as a function of frequency f (broken line in FIG. 2A) comparable to the characteristic curve of wheel antenna 2 (FIG. 2B). Unfortunately, this resistor dissipates energy that it should supply, hence causing undesirable heating, mainly at the level of power amplifiers 43.

For this reason, it has been proposed to add a nonlinear damping element rather than degrade the quality factor of the antenna by resistors. For this purpose, there is added, for example, branch 13 connected in parallel with coil 10. This branch 13 can consist of two Zener diodes connected in opposite directions, a varistor, or controlled avalanche diodes connected in opposite directions. From an electrical viewpoint, it is equivalent to connect said branch 13 in parallel with capacitor 12 which constitutes the capacitance of the resonant circuit. This is because the limitation of the voltage across the terminals of capacitor 12 ipso facto causes the limitation of voltage U across the terminals of coil 10, by simple application of Kirchoff's laws for the circuit considered. Thus, the advantage of a resonant inductive coupling with a good quality factor is retained, with the limitation intervening only for the fraction of energy supplied cyclically, a fraction that would have the result of raising the voltage across the terminals of the coil beyond what can be supported. In other words, starting at a certain level, only the fraction of energy necessary for maintaining the voltage at the acquired level is taken, and the balance of the energy is dissipated in branch 13.

Figure 1B:
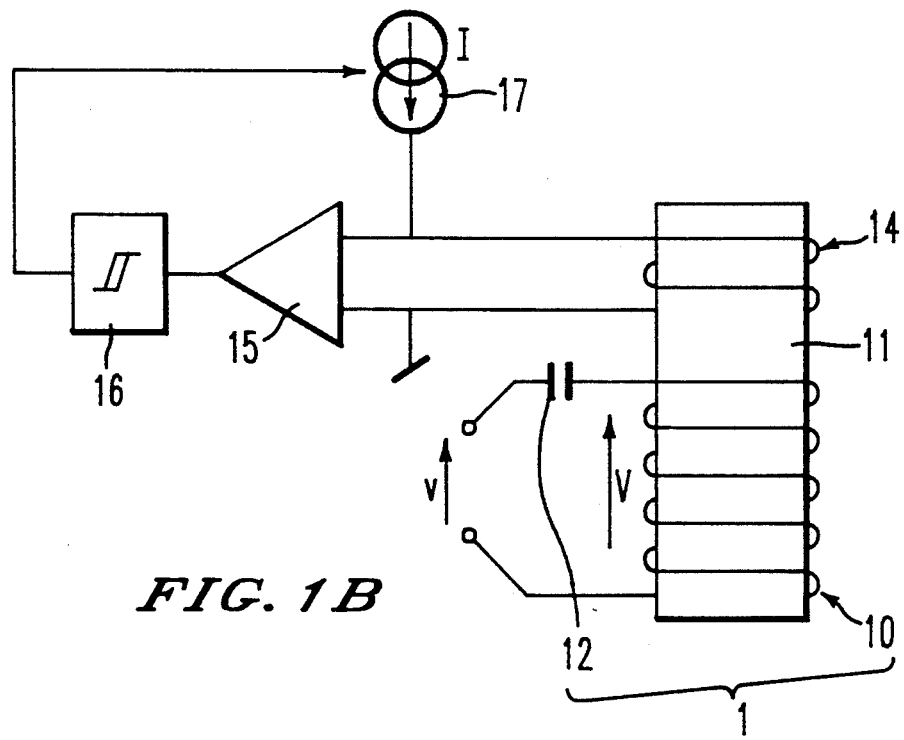
FIG. 1B is a schematic diagram of a second embodiment.

FIG. 1B shows a second embodiment of the limitation where the flux circulating in a magnetic circuit is acted on directly. Antenna 1 comprising a coil 10 and a capacitor 12 can be seen. A core 11 consisting of a magnetic ferrite can also be seen. A control coil 14 takes in the flux generated by coil 10. The voltage across the terminals of coil 14 is amplified (15) and subjected to a threshold element 16. This element beyond the limit selected, controls a current source 17 which, by sending a constant direct current, polarizes the magnetic core to move the operating point to the saturation zone, so that the resonance phenomenon remains limited to a predetermined value, conditioning the choice of threshold element 16. Thus, a limitation of the energy sent by emitting coil 10 is also obtained. It is also possible to consider limiting the flux by means of a saturable ferrite constituting core 11.

FIG. 3 unites various chronograms that show, in solid lines, excitation signal v applied across the terminals of fixed antenna 1, then in broken lines, the shape of voltage U across the terminals of the coil for an undamped resonant circuit, and in dot-dash lines the shape of voltage U for a circuit comprising branch 13. It is noted that, contrary to standard damping based on resistors, only the additional energy input is dissipated, in proportion to the fraction of voltage exceeding the level marked Z in FIG. 3, which remains very much smaller even in the voltage range where the Zener diodes become momentarily conductive.

Figure 4:
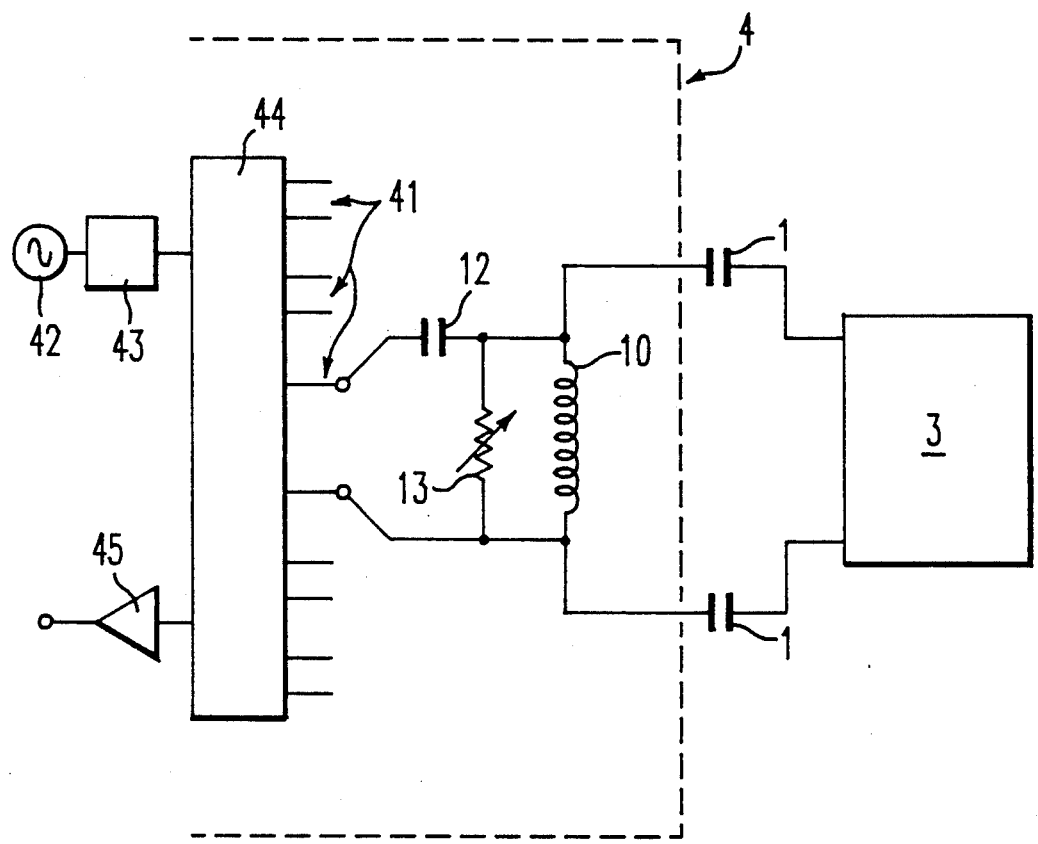
FIG. 4 is a schematic diagram of another embodiment of the present invention.

Such a nonlinear limitation of the antenna can also be considered for an antenna using capacitive coupling, as shown in FIG. 4. Moreover, there can be noted, even with coil-shaped antennas, a very small part of the capacitive coupling between the coils is caused by the conductive wire acting as a capacitor plate. In this case, for a tire monitoring device using the transmission by capacitive coupling between an antenna integral with the wheel and an antenna integral with the wheel support, the antenna comprises a capacitor plate from which an electric field radiates, a coil of given inductance and a capacitor. Most importantly, it includes a device to clip the electric field radiating from the capacitor plate. These are selected and arranged as explained above.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. First antenna integral with a wheel support for a tire monitoring device which transmits by inductive coupling with a second antenna integral with a wheel, said first antenna comprising:
   an inductance forming coil;
   a capacitance connected to said coil, said capacitance and said coil forming a resonant circuit; and
   means to clip the flux passing from said first antenna to said second antenna, so as to introduce a non-linear damping of said resonant circuit whereby said first antenna acquires a combination of a high quality factor and a broad pass band.

2. First antenna according to claim 1, wherein said means to clip comprises a branch connected in parallel with said coil, said branch comprising two Zener diodes connected in series and in opposite directions.

3. First antenna according to claim 1, wherein said means to clip comprises a branch connected in parallel with said capacitance, said branch comprising two Zener diodes connected in series and in opposite directions.

4. First antenna according to claim 1, wherein said means to clip comprises a branch connected in parallel with said coil, said branch comprising a varistor.

5. First antenna according to claim 1, wherein said means to clip comprises a branch connected in parallel with said capacitance, said branch comprising a varistor.

6. First antenna according to claim 1, wherein said means to clip comprises a branch connected in parallel with said coil, said branch comprising a controlled avalanche diode.

7. First antenna according to claim 1, wherein said means to clip comprises a branch connected in parallel with said capacitance, said branch comprising a controlled avalanche diode.

8. First antenna according to claim 1, wherein said means to clip comprises a magnetic circuit comprising a saturatable ferrite.

9. First antenna according to claim 8, wherein said means to clip further comprises a coil for control of the flux circulating in the magnetic circuit of said first antenna.

10. First antenna according to claim 1, wherein said means to clip dissipates energy in said resonant circuit and limits a voltage applied to said coil.

11. First antenna integral with a wheel support device which transmits by capacitive coupling with a second antenna integral with a wheel, said first antenna comprising:
   a capacitor plate from which an electric field radiates;
   a coil of given inductance;
   a capacitor of given capacitance, said capacitance of the capacitor and said inductance forming a resonant circuit; and
   means to clip the electric field radiating from the capacitor plate so as to introduce a non-linear damping of said resonant circuit whereby aid first antenna acquires a combination of a high quality factor and a broad pass band.

12. First antenna according to claim 11, wherein said means to clip comprises a branch connected in parallel with the coil, said branch comprising two Zener diodes connected in series and in opposite directions.

13. First antenna according to claim 11, wherein said means to clip comprises a branch connected in parallel with the capacitor, said branch comprising two Zener diodes connected in series and in opposite directions.

14. First antenna according to claim 11, wherein said means to clip comprises a branch connected in parallel with the coil, said branch comprising a varistor.

15. First antenna according to claim 11, wherein said means to clip comprises a branch connected in parallel with the capacitor, said branch comprising a varistor.

16. First antenna according to claim 11, wherein said means to clip comprises a branch connected in parallel with the coil, said branch comprising a controlled avalanche diode.

17. First antenna according to claim 11, wherein said means to clip comprises a branch connected in parallel with the capacitor, said branch comprising a controlled avalanche diode.

18. First antenna according to claim 11, wherein said means to clip dissipates energy in said resonant circuit and limits a voltage applied to said coil.

* * * * *